United States Patent
Kanemoto et al.

(10) Patent No.: US 7,357,954 B2
(45) Date of Patent: Apr. 15, 2008

(54) PROCESS FOR PREPARING INSTANT RICE AND PRODUCT THEREOF

(75) Inventors: Shigeharu Kanemoto, Tokyo (JP); Keishi Wakabayashi, Tokyo (JP); John H. Kendall, Sugar Land, TX (US); Ranvir B. Mohindra, Houston, TX (US)

(73) Assignee: Satake Corporation, Tokyo (JP)

( * ) Notice: Subject to any disclaimer, the term of this patent is extended or adjusted under 35 U.S.C. 154(b) by 409 days.

(21) Appl. No.: 10/699,160

(22) Filed: Oct. 30, 2003

(65) Prior Publication Data
US 2004/0126476 A1    Jul. 1, 2004

(30) Foreign Application Priority Data
Nov. 13, 2002    (JP)    ............... 2002-329103

(51) Int. Cl.
*A23L 1/182*    (2006.01)
*B02B 5/02*    (2006.01)

(52) U.S. Cl. ............ 426/507; 426/508; 426/509; 426/615

(58) Field of Classification Search ........ 426/615, 426/506, 509, 510, 438, 507, 508
See application file for complete search history.

(56) References Cited

U.S. PATENT DOCUMENTS 3,759,380 A * 9/1973 Mathews ............... 209/22
4,687,669 A * 8/1987 Moritaka et al. .......... 426/72
5,275,836 A    1/1994 Lewis et al.

FOREIGN PATENT DOCUMENTS

JP    92006330 B  *  3/1984
WO    WO 97/49300    12/1997

OTHER PUBLICATIONS

Walton Feed, Rice. http://waltonfeed.com/self/rice.html pp. 1-4 Jul. 8, 2001 Date obtained from http://web.archive.org.*
Parboiled rice, Wikipedia.com. http://en.wikipedia.org/wiki/Parboiled_rice. p. 1. Apr. 20, 2006.*
Inosuke Furuya et al. Japanese Published Patent Application (B2) No. 04-006330, Manufacturing Method for Dried Cooked Rice, Feb. 5, 1992. Translated by USPTO Feb. 26, 2007. pp. 1-6.*

* cited by examiner

*Primary Examiner*—Lien Tran
*Assistant Examiner*—Kelly Mahafkey
(74) *Attorney, Agent, or Firm*—Wells St. John, P.S.

(57) ABSTRACT

Milled rice grains are primarily immersed, and at least surface layers of the grains are converted to the alpha-type. The rice grains are then preliminarily dried and consummatively polished, and are further subjected to secondary immersing and secondary alpha-type conversion. During these processes, there occurs no cracking on the surfaces of the rice grains. The consummatively polished rice grains are then separated into individual single grains. The separated individual single grains are finally dried whereby the finished product of instant rice is obtained. The instant rice containing polished rice has good appearance and quality.

16 Claims, 10 Drawing Sheets

PROCESS FOR PREPARING INSTANT RICE AND PRODUCT THEREOF

RELATED APPLICATION

This application relates to and claims a priority from the corresponding Japanese Patent Application No. 2002-329103 filed on Nov. 13, 2002.

BACKGROUND OF THE INVENTION

The present invention relates to instant rice containing polished rice and a process for preparation of the said instant rice.

DESCRIPTION OF THE RELATED ART

To date, it is known that fast cookable rice is rice that can be cooked in a far shorter period of time than that required for cooking ordinary rice. Instant rice is an example of such fast cookable rice. Among variety of fast cookable rice, the cooking time required for cooking instant rice is particularly short. For example, it is known that the instant rice can be cooked within about 5 to 10 minutes more or less. Preparation of the instant rice is carried out through several steps, including immersing polished rice, converting polished rice to its alpha-structure type with applying heat, then separating the converted rice into single grains, and drying the said rice in the form of single grains to give the finished product of instant rice.

In the category of the said fast cookable rice, there is a type so-called "simply cookable rice" that is positioned as rice requiring a longer period time than that required for cooking the instant rice (See, for example, PCT Official Gazette WO 97/49300 (Pages 33 to 34)). In this patent publication, a process for preparing the said simply cookable rice is disclosed. In this process, the simply cookable rice can be prepared via several steps including immersing brown rice from which hulls were removed, subjecting the immersed brown rice to thermal processing for alpha-structure type conversion, preliminarily drying and consummatively polishing, and then consummatively drying the polished rice to thereby give the finished product.

Furthermore, another process for preparing simply cookable rice similar to the process of the above Japanese patent publication is described in U.S. Pat. No. 5,275,836 (Page 4). The process of this U.S. patent is to prepare simply cookable rice via steps including milling brown rice, immersing the milled rice in water, subjecting the immersed rice to alpha-structure type conversion, preliminary drying the converted rice, consummatively polishing the dried rice, and consummatively drying the polished rice to thereby give the finished product.

Since the said preparation process of the instant rice includes immersing polished rice and subjecting the rice to heating for alpha-structure type conversion, the surface layers of rice grains become less rigid and tend to be broken. Accordingly, there is a tendency that rice grains of those which surfaces were cracked due to contacts between rice grains with each other during transportation thereof and during a process to separate the rice grains into single grains. Further, when the separation of the rice grains into single grains is operated, starch flows out from the surfaces of the cracked rice grains, which becomes the cause of loss of nutrients in the rice grains. In addition, rice grains with broken shapes also appear. Even though such rice grains with broken shapes are dried to give the finished product, there is a problem that they are regarded as low grades in their appearance and quality. In addition, when they are cooked, they may be broken further during boiling, whereby giving undesirable taste.

It is understood that the simply cookable rice disclosed in the above PCT Official Gazette WO 97/49300 is in a state that the rice grains could have absorbed no sufficient water thereinto since water absorption into brown rice may not be completed well by the method of immersion, and therefore, conversion of the rice grains to the alpha-structure type have not fully completed yet. Thus, it is supposed that the simply cookable rice can be converted to the alpha-structure type completely by further including an additional step capable of facilitating the said conversion to the aforesaid preparation process. Specifically, the simply cookable rice is immersed, subjected to heating, separated to single grains, and consummatively dried. However, cracking on the surfaces of the rice grains has occurred during the final drying step. If such rice grains with cracked surfaces are immersed and subjected to heating, there is a fear that starch converted to the alpha-structure type flows out from the cracked portions, or the cracking is further developed to cause breaks of the rice grains. If so occurred, the rice grains having been consummatively dried may be degraded in their appearance and quality, and they may be broken during cooking.

Similarly, such rice grains having received cracking during the final drying step may be generated in the simply cookable rice described in the above U.S. Pat. No. 5,275,836 as well. Therefore, there is the same fear as described above when the simply cookable rice of this literature is converted to a form of instant rice.

SUMMARY OF THE INVENTION

In view of the aforementioned drawbacks, it is an object of the present invention to provide instant rice containing polished rice, which is resistant to breaks in their shapes and a process for preparing the same.

In order to achieve the aforementioned object, according to one aspect of the present invention, there is provided a process for preparing instant rice, comprising:

a milling step for milling brown rice to remove a controlled proportion of bran layer;

a primary immersing step for causing rice grains obtained in the said milling step to absorb water;

a primary alpha-type conversion step for converting at least surface layers of the rice grains obtained in the said immersing step to the alpha-structure type;

a preliminary drying step for drying the rice grains obtained in the said primary alpha-type conversion step up to a moisture content higher than a moisture content after a final drying;

a final polishing step for consummatively polishing the rice grains obtained in the said preliminary drying step;

a secondary immersing step for causing the rice grains obtained in the said final polishing step to absorb water once again;

a secondary alpha-type conversion step for completely converting the rice grains obtained in the said secondary immersing step to the alpha-type;

a separation-into-single-grains step for separating the rice grains obtained in the said secondary alpha-type conversion step into single grains; and a final drying step for consummatively drying the rice grains obtained in the said separation-into-single-grains step.

According to the above preparation process, the rice grains milled in the milling step absorb water in the primary immersing step. Then, at least the surface layers of the rice grains are converted to the alpha-structure type in the primary alpha-type conversion step either by cooking or steaming. At this stage, about 70% of the whole rice grains are converted to the alpha-type. During the primary alpha-type conversion, no cracking occurs on the surfaces of the rice grains due to a protecting effect of the residual bran layers given to the starch layers. Therefore, there happens neither flow out of starch having been converted to the alpha-type nor breaks in the shapes of the rice grains. Further, the primary alpha-type conversion allows permeation of nutrients, such as vitamin B1 and minerals contained in the residual bran, into starch. In addition, the degree of coloring with bran onto the starch layers is reduced because the milled rice grains are converted to the alpha-type in the primary alpha-type conversion step. Then, the rice grains are preliminarily dried in the preliminary drying step until that the moisture content in the rice grains falls within a range, for example, of 22 to 24%. With the said preliminary drying, strength of the portions of the rice grains other than the core portions but including the surface layers having been converted to the alpha-type increases, which makes it possible to mill and polish the rice grains in the following final polishing step. After immersing the rice grains having been consummatively polished again in the secondary immersing step, the core portions which have not been converted to the alpha-type are converted to the alpha-type in the secondary alpha-type conversion step. During the secondary alpha-type conversion, cracking on the surfaces of the rice grains, which is due to contacts of the rice grains with each other and the like, will not occur because the portions of the rice grains other than the core portions have been already converted to the alpha-type and dried preliminarily, and therefore, they are provided with strength which makes rice grains resistant to the breaks thereof. Thus, starch having been converted to the alpha-type and existing in the core portions will never flow out. Then, the rice grains having been converted completely to the alpha-type are fed to the separation-into-single-grains step, where they are separated into single grains. At this stage, cracking on the surface layers of the rice grains is prevented from occurring, and no breaks in the shapes thereof will be caused, because the surface layers of the rice grains have been strengthened, which makes rice grains resistant to breaks thereof as described above. Then, the rice grains are dried in the final drying step, which is the last step of the whole process, until that the moisture content in the grains reaches to a prefixed moisture content, thereby giving the instant rice containing polished rice.

According to another aspect of the invention, there is provided instant rice which is prepared according to the above process.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
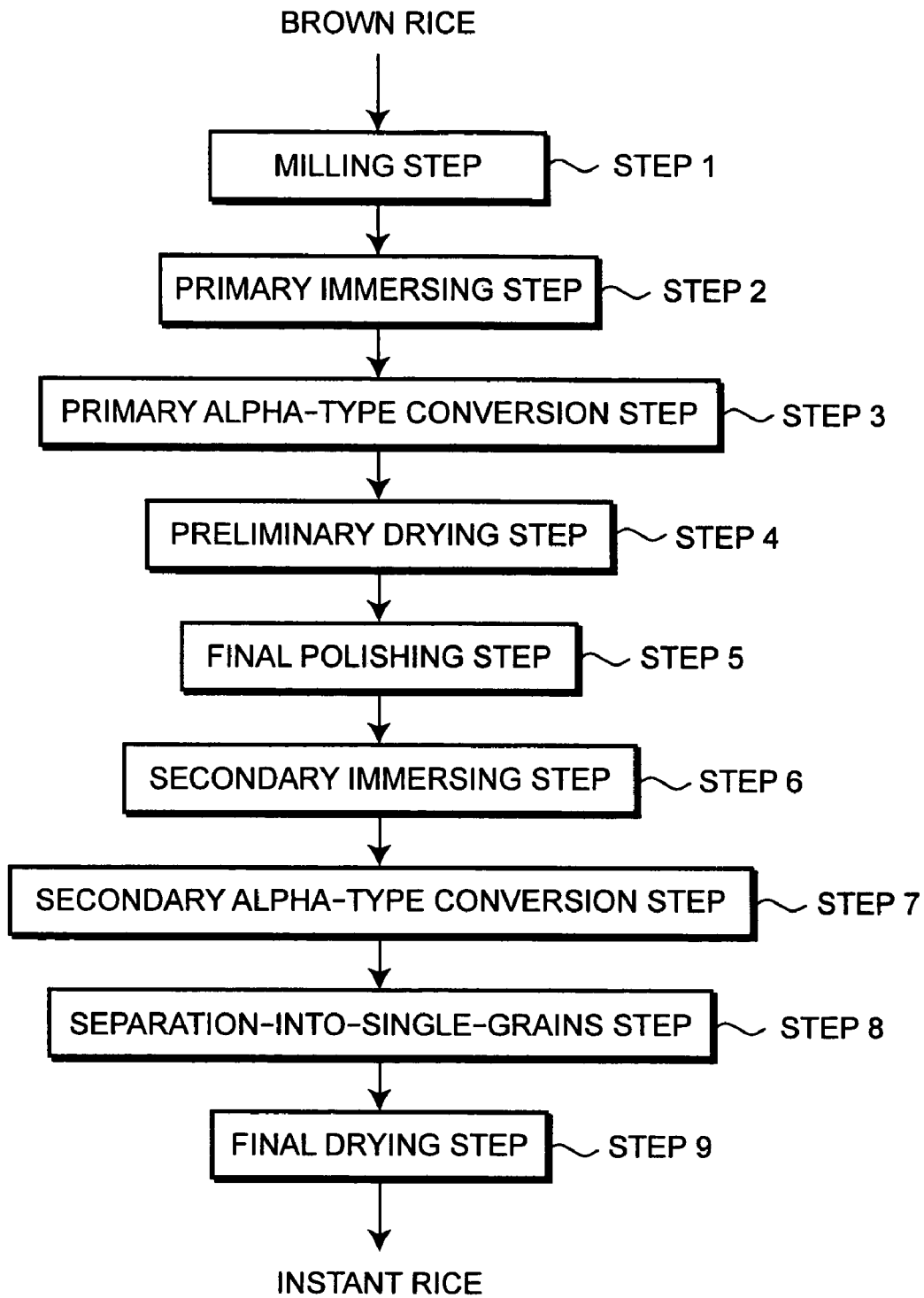
FIG. 1 is a process flow for preparing the instant rice containing polished rice according to the present invention.

Now, a preferred embodiment for carrying out the present invention will be explained in the following. FIG. 1 shows a flow for explaining the steps for preparing the instant rice containing polished rice according to the present invention. The flow of steps in FIG. 1 comprises a milling step (Step 1), a primary immersing step (Step 2), a primary alpha-type conversion step (Step 3), a preliminary drying step (Step 4), a final polishing step (Step 5), a secondary immersing step (Step 6), a secondary alpha-type conversion step (Step 7), a separation-into-single-grains step (Step 8) and a final drying step (Step 9).

In the following, the constitutions of apparatus embodiments to be used in each of the aforesaid steps will be explained.

Figure 2:
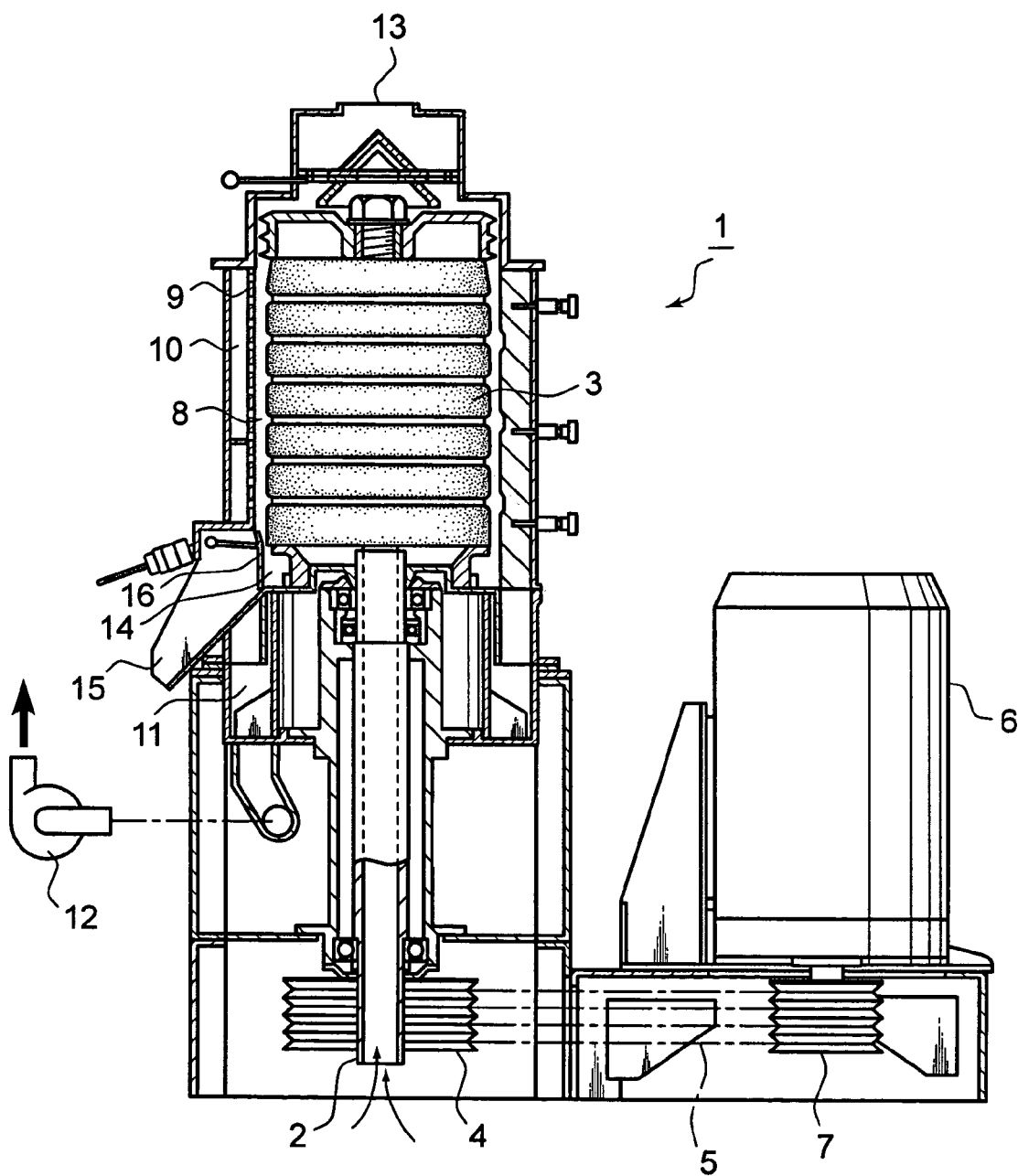
FIG. 2 is a cross-section in side view of a vertical-type abrasive roll rice polishing machine used in a milling step and a final polishing step.

In the milling step (Step 1), a vertical-type abrasive roll rice polishing machine 1 (Model type: VTA) manufactured by Satake Corporation as shown in FIG. 2 may be preferably used, for example. The vertical-type abrasive roll rice polishing machine 1 includes a main shaft 2 set vertically and supported by a shaft. At the upper portion of the main shaft 2, a plurality of abrasive hone rolls 3 are installed around the shaft. At the lower end of the main shaft 2, a pulley 4 is mounted to the main shaft. The pulley 4 is coupled to another pulley 7, which is mounted to a power shaft of a motor 6, via a power transmission belt 5. Around the hone rolls 3, a porous screen 9 through which polished-off rice bran can pass through is peripherally constructed with a preset space 8 (polishing room) therebetween. Further, around the outer circumference of the porous screen 9, a room 10 for receiving the polished-off rice bran having passed through the porous screen 9 is constructed. The room 10 for housing the polished-off rice bran is jointed with an exhaust air fan 12 via a passage 11 so that rice bran can be evacuated to outside the machine. Above the hone rolls 3, there is provided a raw material supply port 13. Underneath the polishing room 8, an exit port 14 for evacuating rice having been milled is provided, and to the exit port 14 is connected an exit chute 15. In addition, a resistance lid 16 adapted to control the polished degree of rice is provided at the exit port 14. Note that the coarseness of the hone rolls 3 is preferably in a range of #30 to #36, for example.

Figure 3:
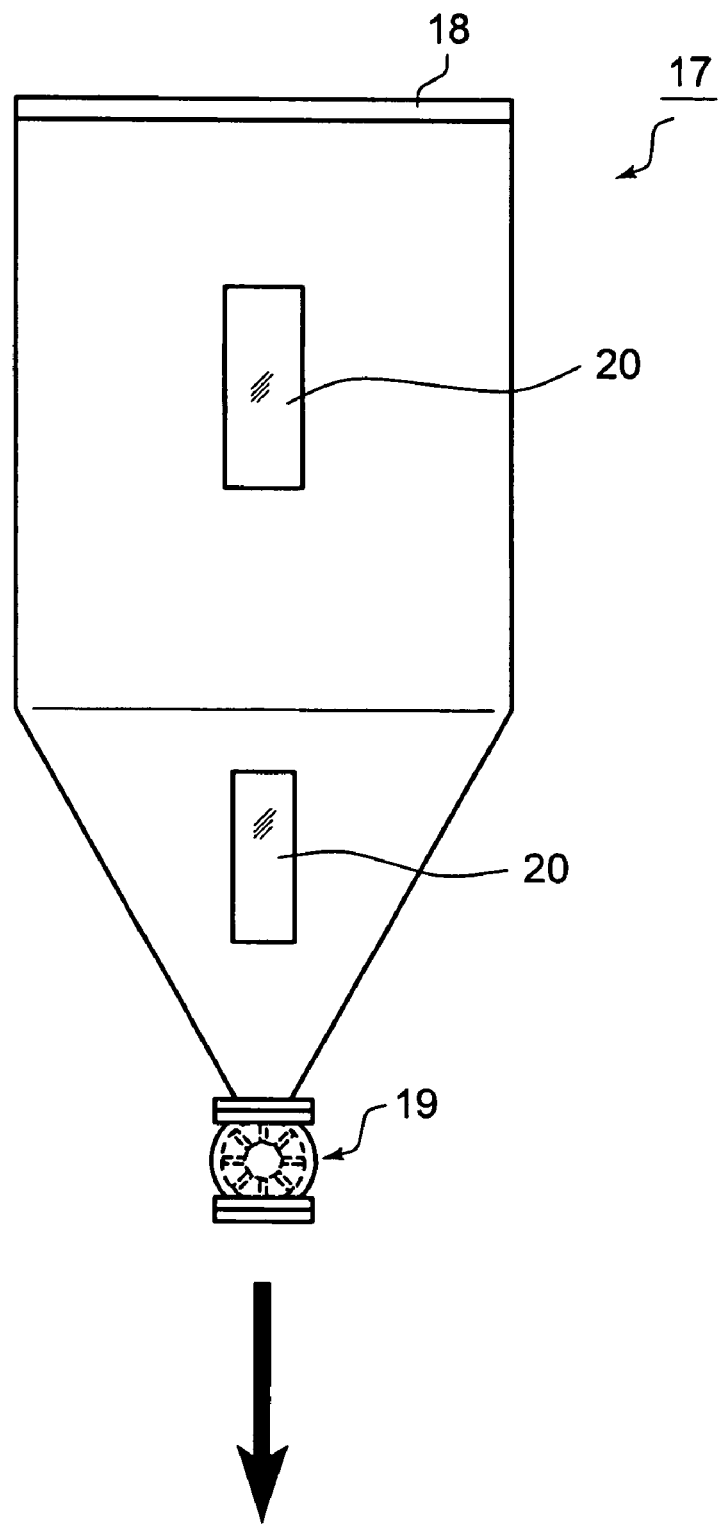
FIG. 3 is a front view of a tank for immersing used in a primary immersing step.

It is preferable to use a tank 17 shown in FIG. 3 in the primary immersing step (Step 2). The tank 17 has a shutter 18 on the upper portion thereof, and a rotary valve 19 is provided to an exit port at the lower end. Besides the above, windows 20 are formed in the side faces of the tank 17, which enable to watch inside the tank.

Figure 4:
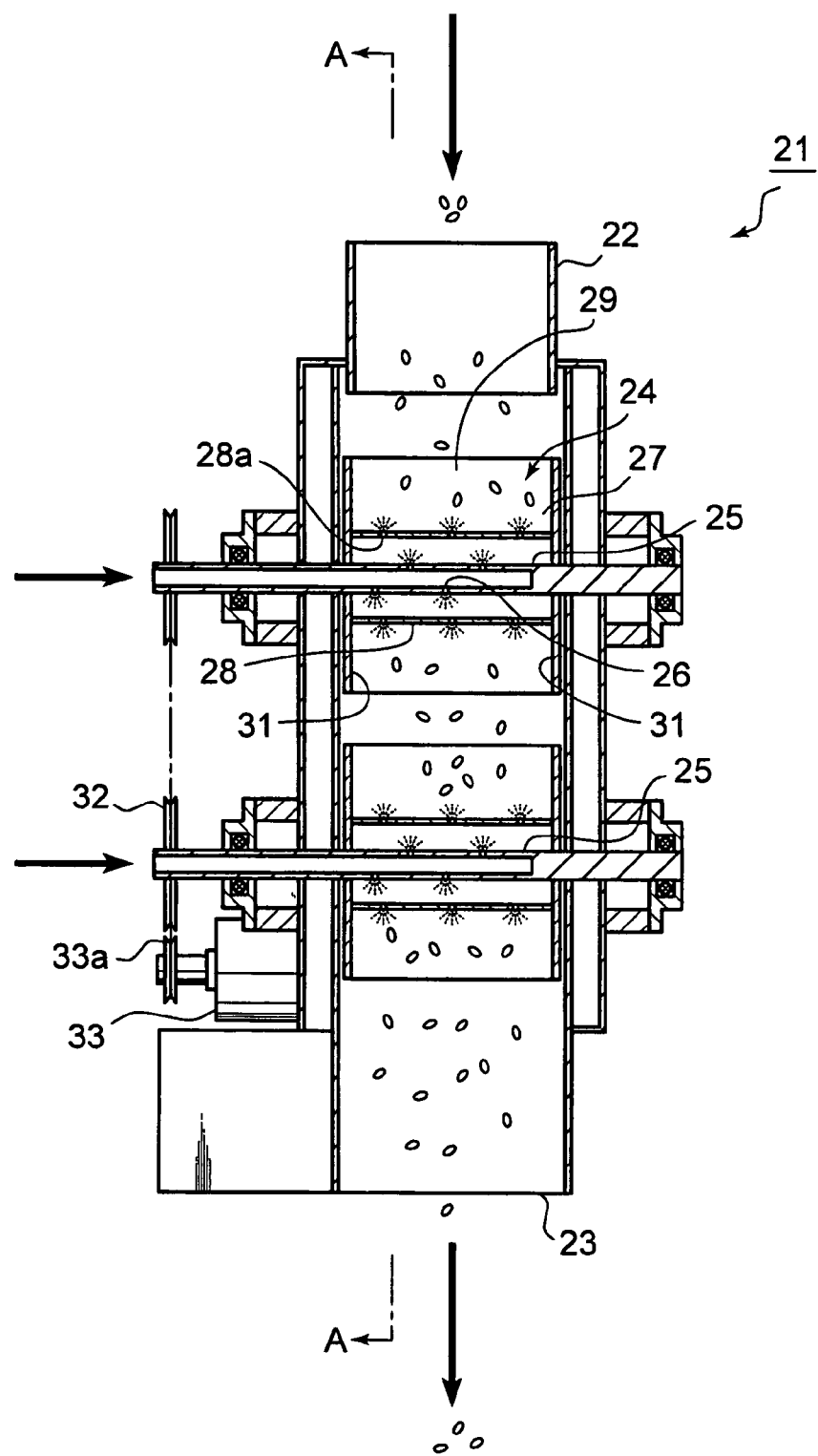
FIG. 4 is a cross-section in side view of a boiling apparatus used in primary and secondary boiling steps.
Figure 5:
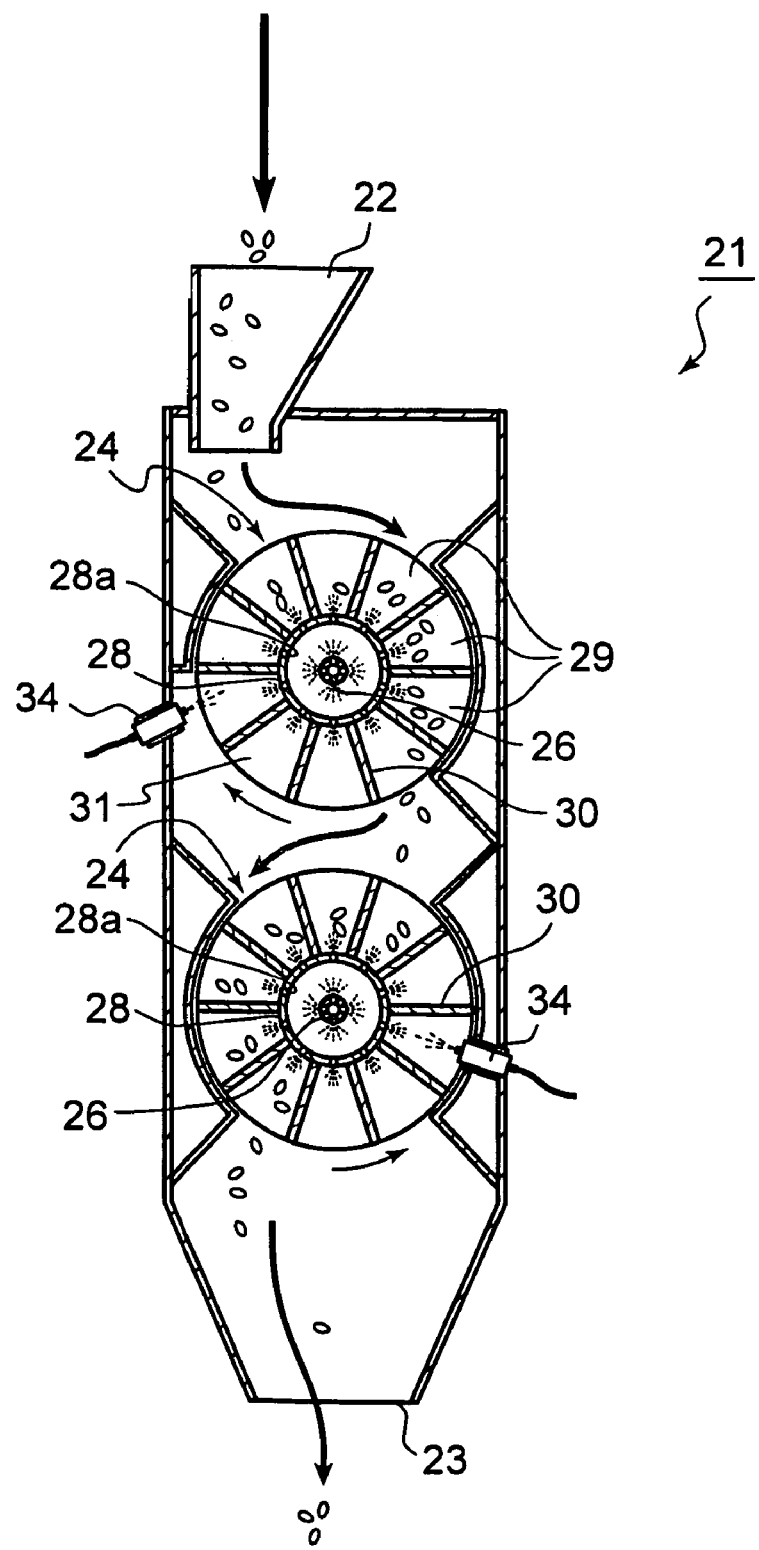
FIG. 5 is a cross-section cut along a line A-A in FIG. 4.

It is preferred to use a boiling apparatus 21 shown in FIG. 4 and FIG. 5 in the primary alpha-type conversion step (Step 3). FIG. 4 is a cross-section in side view of the boiling apparatus 21, and FIG. 5 is a cross-section cut along a line A-A shown in FIG. 4. To the top of the boiling apparatus 21 is provided a raw material supply hopper 22, and to the lower end of the boiling apparatus 21 is provided an exit port 23. Between the exit port 23 and the raw material supply hopper 22, a plurality of rotary-type feeding sections 24 adapted to feed raw materials are transversely installed at the upper and lower positions in the area therebetween. Although the number of the feeding sections 24 is fixed to two in FIGS. 4 and 5, the number may be appropriately decided depending on requirement. Each feeding section 24 is transversely installed with being supported by a hollow rotary shaft 25. To the rotary shaft 25 are provided a plurality of steam-ejecting holes 26 adapted to eject steam into cylinders 28 that will be described later. The said steam is generated by a steam-generating means (not shown) and is supplied from an end of the rotary shaft 25 into inside the hollow thereof. Around the steam-ejecting holes 26 in the rotary shaft 25, a drum section 27 is mounted with support of the shaft. The drum section 27 is constituted by the cylinder 28 extending in a direction along the rotary shaft 25, a plurality of partition plates 30 radially arranged so as to extend from the circumferential side face of the cylinder 28 and forming a plurality of compartments 29 in the outer circumference side of the cylinder 28, and circular disks 31 adapted to shut each of left and right ends of openings of the cylinder 28 and joint to the partition plates 30 to form one face of the compartment 29. To the side face of the cylinder 28 is provided a steam-ejecting hole 28*a* adapted to eject steam having been inflated in the cylinder 28 into the boiling apparatus 21. To one end side of the respective rotary shafts 25 is mounted a pulley 32, and the pulley 32 is coupled via a power transmission belt to a pulley 33*a* mounted to a power shaft of a motor 33. The upper and lower feeding sections 24 constituted as described above are configured such that they rotate toward the reciprocal direction with each other. In the vicinities of the respective feeding sections, single or a plurality of nozzles 34 for ejecting steam toward the compartments 29 are arranged, and these nozzles 34 are connected to the steam-generating means (not shown). Steam ejected from the nozzles 34 is for both purposes of acting for the alpha-type conversion of rice grains and facilitating rice grains having been attached to the walls of the respective compartments 29 to be separated therefrom. Note that the steam ejected from the steam-ejecting hole 28*a* works to assist the alpha-type conversion of rice grains. The revolution control for the respective feeding sections 24 may be set appropriately. For example, the revolution frequency may be set to a rate of 1 to 3 revolutions per minute in a revolution manner of either continuous or intermittent.

Figure 6:
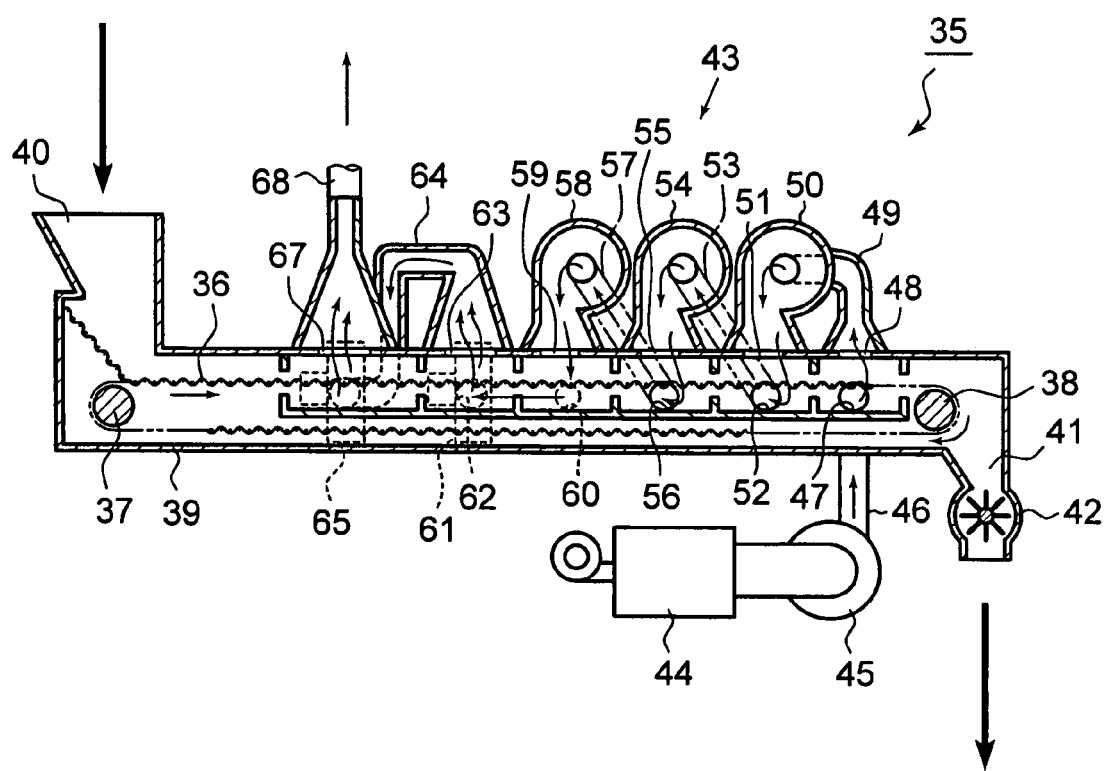
FIG. 6 is a cross-section in side view of a drier used in a preliminary drying step and a final drying step.

In the preliminary drying step (Step 4), a drier 35 of a conveyer type as shown in FIG. 6 may be advantageously used. This drier 35 includes a conveyer belt 36 of a reticular type in which a large number of holes with dimensions through which at least rice grains cannot pass are formed. The conveyer belt 36 is set in a state that it is drawn by a pair of rollers 37, 38 being horizontally arranged at one position and the other position, respectively, and the conveyer belt 36 is configured to be rotated in a direction indicated by an arrow by driving of either one of the rollers 37, 38. The conveyer belt 36 is surrounded by a frame 39. To the frame 39 arranged to the upper position at the conveyance starting end side of the conveyer belt 36 is installed a supply hopper 40, and to the frame 39 arranged to the lower position at the conveyance termination end side of the conveyer belt 36 is constructed an exit port 41. To the exit port 41 is installed a rotary valve 42. On the medial position in the conveyance direction of the conveyer belt 36 is installed a hot air blowing apparatus 43. The hot air blowing apparatus 43 includes a hot air generating means 44, which is coupled to an opening 47 formed in the lateral portion of the frame 39 at the conveyance termination end side of the conveyer belt 36 via a fan 45 and a ventilation duct 46. Hot air supplied from the opening 47 enters a space between the upper and lower belts of the conveyer belt 36, passes the upper belt, and is further sucked into a fan 50 via an opening 48 formed in the upper frame 39 and a ventilation duct 49. The hot air sucked into the fan 50 is blown from an opening 51 formed in the upper side of the frame 39 further close to the conveyance starting end side of the conveyer belt 36 toward the upper belt of the conveyer belt 36. The said hot air having passed downward through the upper belt is then evacuated from an opening 52 formed in the lateral portion of the frame 39 and blown from an opening 55 formed in the upper portion of the frame 39 close to the conveyance starting end side toward the upper belt of the conveyer belt 36 via a ventilation duct 53 and a fan 54, similarly to the ventilation duct 49 and the fan 50 as described above. Then, similarly to the configuration as described above, the hot air passes an opening 56, a ventilation duct 57, a fan 58 and an opening 59, and is then evacuated from an opening 60 formed in the lateral portion of the frame 39. And, it is configured such that the hot air evacuated from the opening 60 passes from a space between the upper and lower belts through the upper belt via a fan 61 and an opening 62 formed in the lateral portion of the frame 39 close to the conveyance starting end side. The hot air is then evacuated from an opening 63 formed in the frame 39 over the belt. The evacuated air enters a fan 65 via a ventilation duct 64, and passes from a space between the upper and lower belts through the upper belt and is finally evacuated from the frame 39 via an opening 67 formed in the frame 39 over the belt and an evacuation duct 68.

In the final polishing step (Step 5), it is preferred to use a rice polishing machine similar to the vertical-type abrasive roll rice polishing machine 1 as described above. The coarseness of the hone rollers 3 is preferably selected from sizes of #30 to #36, which is coarser than that employed in the said milling step (Step 1). This is because of preventing the machine from clogging up that tends to occur when rice grains with high moisture contents are milled.

Figure 7:
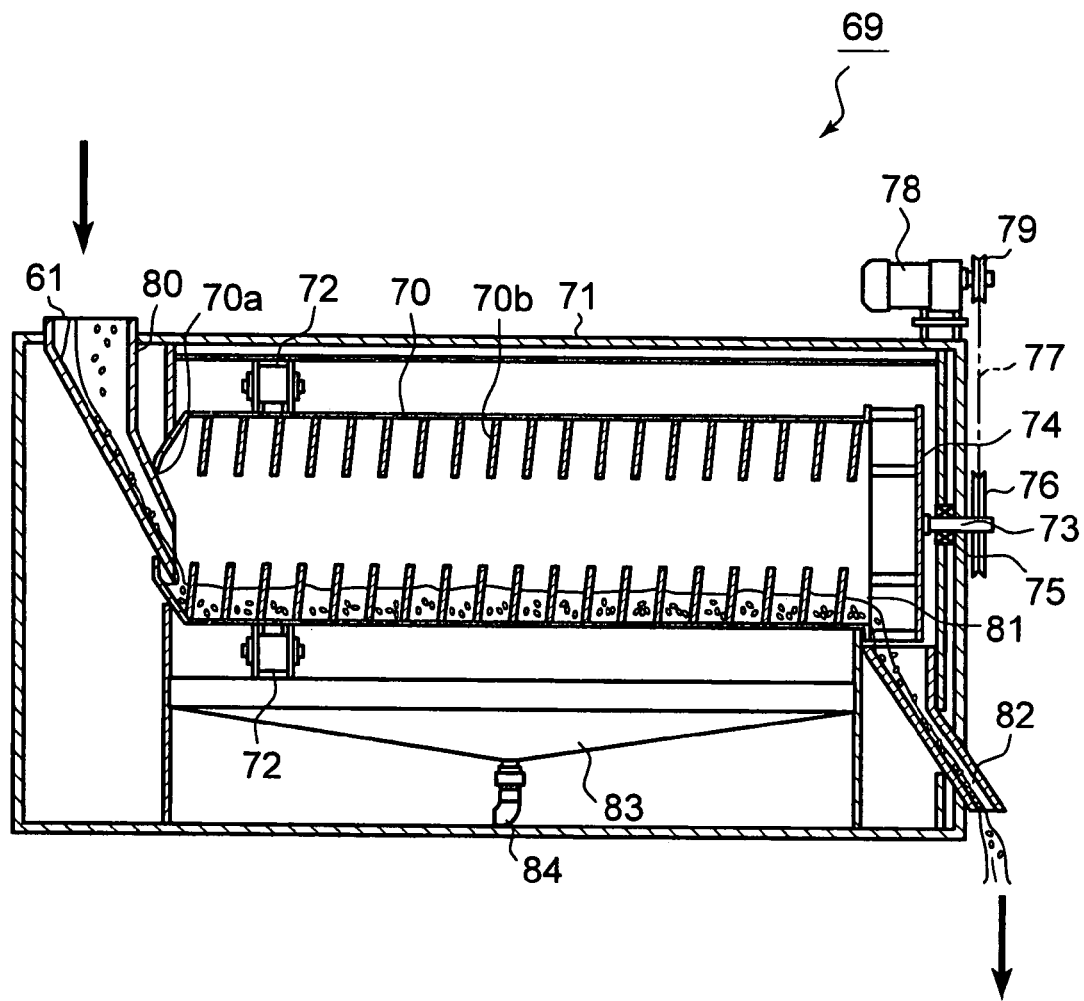
FIG. 7 is a cross-section in side view of an immersing apparatus used in a secondary immersing step.

In the said secondary immersing step (Step 6), it is preferred to use an immersing apparatus 69 as shown in FIG. 7. In this immersing apparatus 69, a non-porous rotary cylinder 70 is transversely installed in a frame 71. Either one of the end portions of the rotary cylinder 70 is rotatably supported by a rotary supporting members 72 inside the frame 71. To the other end side of the rotary cylinder 70 is mounted a supporting plate 74 into which a rotary shaft 73 is mounted. The rotary shaft 73 is supported to the frame 71 by means of a bearing 75. The rotary cylinder 70 is configured in rotatable by means of the rotary supporting members 72 and the rotary shaft 73, and the rotary shaft 73 is connected to a pulley 76, a belt 77 and a pulley 79 mounted to a power shaft of a motor 78. A supply hopper 80 is installed to the frame 71, and the evacuation side of the supply hopper 80 is configured to position inside an opening 70*a* formed at one of the end portions of the rotary cylinder 70 being transversely installed. To the other end side of the rotary cylinder 70 is formed an exit port 81, and an exit chute 82 is connected to the exit port 81. Spiral blades 70b are included on the inner wall of the rotary cylinder 70, which is for feeding raw materials toward the exit port 81. Note that a drain spout 83 is installed underneath the rotary cylinder 70, which is adapted to collect water leaked from the rotary cylinder 70 when the immersing is carried out. To the drain spout 83 is provided a drain pipe 84.

In the said secondary alpha-type conversion step (Step 7), it is preferred to use a boiling apparatus similar to the boiling apparatus 21 as described above (See FIGS. 4 and 5).

Figure 8:
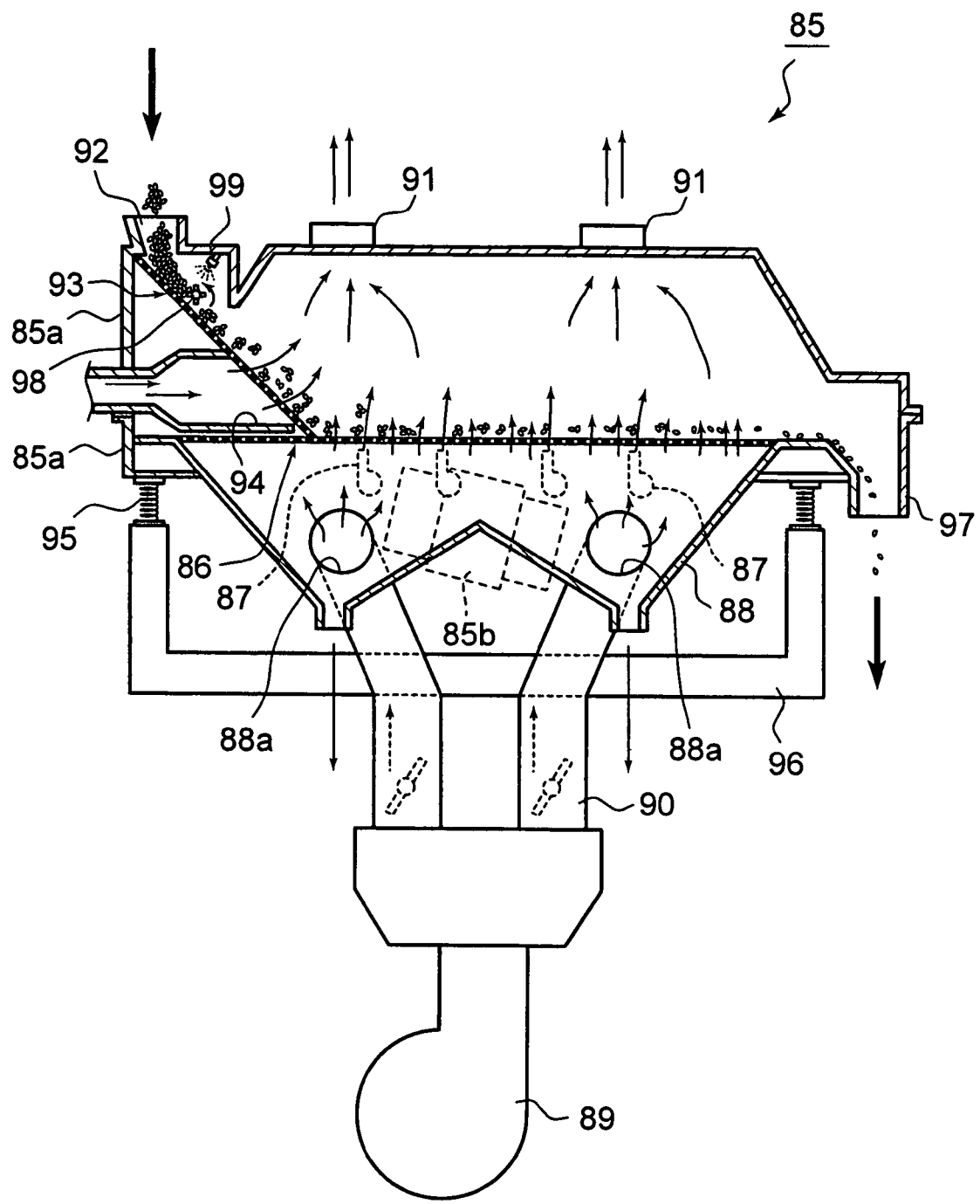
FIG. 8 is a cross-section in side view of a separation-into-single-grains apparatus used in a separation-into-single-grains step.

In the said separation-into-single-grains step (Step 8), it is preferred to use a separation-into-single-grains apparatus 85 as shown in FIG. 8. In the separation-into-single-grains apparatus 85, a reticular screen 86 including a number of holes having dimension through which at least raw materials (rice grains) cannot pass is transversely arranged inside the frame 85a of the said apparatus 85. Underneath the screen 86, a plurality of air ejecting nozzles 87, those which eject air at a high speed toward the screen 86, are arranged in a direction of transporting raw materials. The screen 86 is installed in drawn state to the opened portion at the upper side of a spout 88 in a funnel shape, and the spout 88 is coupled to the lower portion of the frame 85a. To the side wall of the spout 88 are formed openings 88a. These openings 88a are connected to ventilation ducts 90 being connected to an air blowing means 89, respectively. Air blown from the air blowing means 89 and air ejected from the air ejecting nozzles 87 pass the screen 86 and are then evacuated from exit ports 91 provided in the ceiling portion of the frame 85a. At the raw material supply side of the screen 86 in the frame 85a, a supply hopper 92 is provided. Underneath the exit port of the supply hopper 92, a screen 93 inclined toward the aforesaid screen 86 is provided. The screen 93 is configured in a reticular form that includes holes through those which dimension raw materials (rice grains) cannot pass as well as the screen 86. In an area at the reverse side underneath the slope of the screen 93, that is, at the reverse side of a flowing down surface on which raw materials flow down, an air ejecting section 94 is provided. The said air ejecting section 94 is arranged so as to eject air toward the aforesaid flowing down surface and is connected to an air blowing apparatus (not shown). In the vicinity of the lower circumferential edge of the frame 85a, a leg 96 is provided by way of springs 95, and a vibrator 85b is installed in the frame 85a. Raw materials on the screen 86 are transferred to the exit port 97 due to vibration force provided by the vibrator 85b. Over the slope of the screen 93, a breaking up roller 98 provided with a plurality of blades and a water-ejecting nozzle 99 adapted to eject water to raw materials are arranged. This water-ejecting nozzle 99 is connected to a water supply section (not shown) and an air source (not shown). Note that an air-ejecting nozzle adapted to eject high pressured air may be included instead of the water-ejecting nozzle 99. Further, a damper for airflow control is included in the aforesaid ventilation duct 90.

In the said final drying step (Step 9), it is preferred to use a drier similar to the drier 35 as described above (See FIG. 6).

Figure 9:
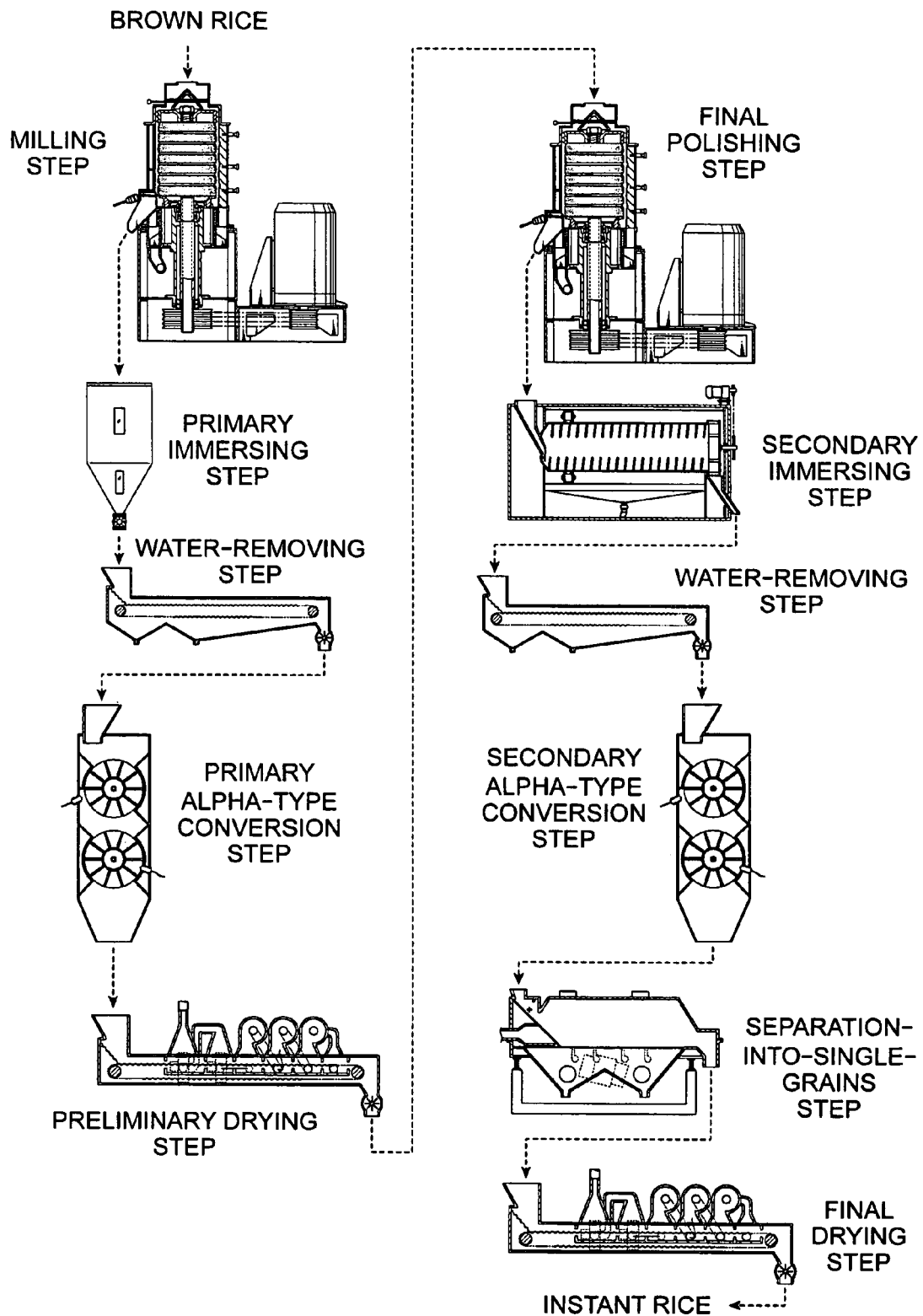
FIG. 9 is a process flow for preparing the instant rice containing polished rice according to the present invention to which a water-removing step is incorporated.
Figure 10:
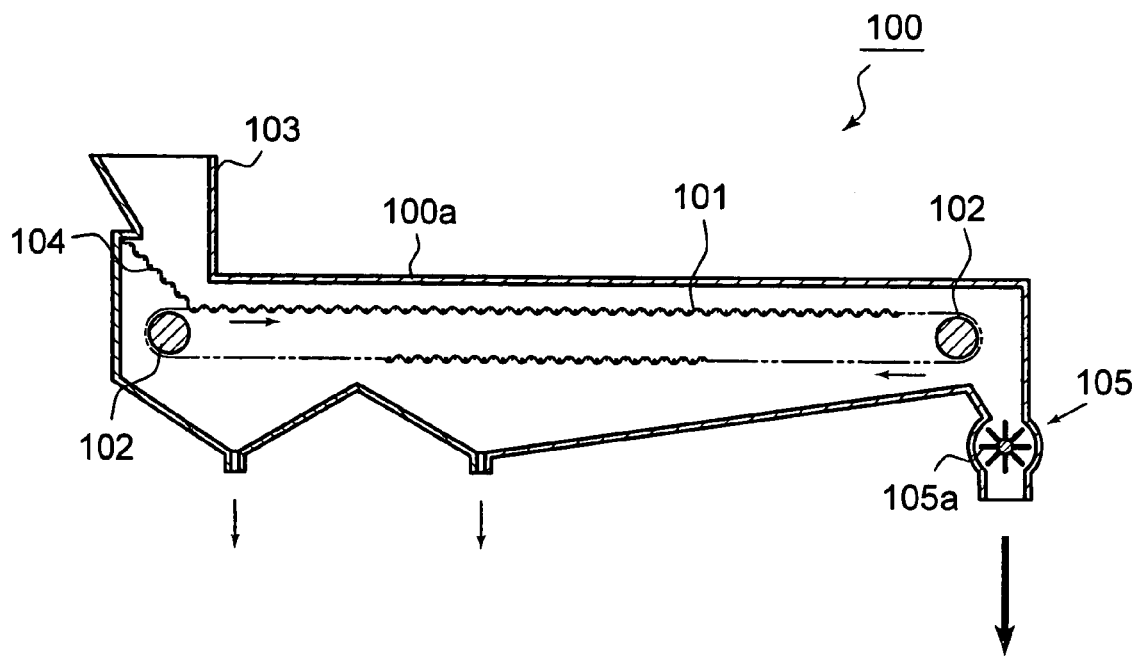
FIG. 10 is a cross-section in side view of a water-removing apparatus used in a water-removing step.

Besides, a water-removing step may be included following to the said primary immersing step (Step 2) and the said secondary immersing step (Step 6), respectively (See FIG. 9). In the water-removing step, it is preferred to use a water-removing apparatus 100 of a belt conveyer type as shown in FIG. 10. This water-removing apparatus 100 is configured to contain a conveyer belt 101 that includes holes through those which dimension raw materials (rice grains) cannot pass and is formed in a reticular form having no end portions, the said conveyer belt being set in a stretched state between a pair of rotary rollers 102, 102, disposed in left and right end sides of the conveyer belt, respectively, in a frame 100a. In an area at the conveyance starting end side of the said frame 100a is provided a supply hopper 103, and in an area at the evacuation side of the supply hopper 103 is provided a screen-like slope section 104 adapted to flow down raw materials to the conveyer belt 101. On the other hand, in an area at the conveyance termination end side of the said frame 100a is provided a raw material exit port 105, and in the exit port 105 is provided a feeding valve 105a.

Now, the operation of the present invention will be described in the following. First of all, brown rice is polished to the extent that 30 to 70% of brown rice is milled by means of the said vertical-type abrasive roll rice polishing machine 1 (Milling step (Step 1)). The milled rice (hereinafter referred to as "rice grains") is immersed in warm water of about 80° C. in the tank 17 for about 15 minutes to adjust the moisture content of the rice grains to about 40% (Primary immersing step (Step 2)). At this stage, it is preferred that the moisture content of rice grains is in a range of 40 to 50%. The rice grains having completed the primary immersing are transferred on the conveyer belt 101 of the aforesaid water-removing apparatus 100 over one minute under normal temperatures so that water in the rice grains may be removed (See FIG. 10).

The water-removed rice grains are then subjected to an incomplete alpha-type conversion process so that 60 to 90% of the rice grains are converted to the alpha-type by means of the aforesaid boiling apparatus 21 (Primary alpha-type conversion step (Step 3)). Specifically, the rice grains are boiled for about 20 minutes in a manner of contacting the rice grains with steam while causing steam of about 100° C. to eject from the air-ejecting hole 28a and the nozzle 34 provided in the boiling apparatus 21. During this operation, revolution time for the feeding sections 24 is appropriately controlled in order to provide good contact of the rice grains with steam. The rice grains having completed the alpha-type conversion process have a moisture content of about 40%, about 70% of which are converted to the alpha-type without receiving cracking on the surfaces of the whole grains, and are in such a state that the central portion inside the individual grain still retains a core having not converted to the alpha-type. Since protection effect on starch layers provided by the residual bran layers is valid, there occurs no cracking on the surfaces of the rice grains. As a result, there happens neither flow out of starch from the rice grains having been converted to the alpha-type nor breaks in the shapes thereof. Besides, after the alpha-type conversion process, nutrients such as vitamin B1 and minerals contained in the residual bran permeate into starch. Further, since bran has been removed from rice grains to some extent due to milling, both amounts of penetration of colors from bran and smell are less.

The rice grains having been primarily converted to the alpha-type are then preliminarily dried by means of the aforesaid drier 35 so that the moisture content thereof falls within a range of 20 to 30% (Preliminary drying step (Step 4)). Specifically, after the rice grains being supplied from the supply hopper 40, they are transferred over 10 minutes toward the exit port 41 by means of the conveyer belt 36 that moves in a direction indicated with an arrow. During the said transfer, the rice grains are dried while receiving hot air of about 110° C. coming from the aforesaid hot air blowing apparatus 43 (fans 50, 54, 58) in upper and lower directions.

It is preferred that the moisture content in the rice grains evacuated from the exit port 41 falls within a range of 20 to 30%. Therefore, moving speed of the conveyer belt 36, the hot air temperature and other conditions are appropriately adjusted so that the moisture content falls within the said preferred range. Note that the rice grains as a whole acquire elasticity owing to having the primary alpha-type conversion process and the preliminary drying process.

The rice grains preliminarily dried are supplied to the vertical-type abrasive roll rice polishing machine 1, where remaining bran is removed from the rice grains to give the finished product of polished rice (Final polishing step (Step 5)). With the final polishing processing, the rice grains become whitish and give less bran smell. If the surfaces of starch layers are further removed, color and smell of the residual bran may be reduced more and whiteness of the rice grains may be increased.

The rice grains having completed the final polishing are supplied to the said immersing apparatus 69, where the secondary immersing process is taken place to adjust the moisture content of the rice grains in a range of about 55 to 60% (Secondary immersing step (Step 6)). Specifically, rice grains and hot water of about 90° C. are supplied from the supply hopper 80 into the rotating rotary cylinder 70 to thereby gradually transfer them by means of the aforesaid spiral blades 70b. It is preferred to transfer rice grains to the exit port 81, for example, over about 9 minutes. Rice grains having been subjected to the secondary immersing process are transferred over 3 minutes under ordinary temperatures on the conveyer belt 101 in the aforesaid water-removing apparatus 100 for removing water (See FIG. 10).

Rice grains having completed the water-removing process are supplied to the aforesaid boiling apparatus 21, where they are subjected to the secondary alpha-type conversion process (Secondary alpha-type conversion step (Step 7)). Specifically, the rice grains are boiled for about 10 minutes in a manner of contacting the rice grains with steam while causing steam of about 100° C. to eject from the air-ejecting hole 28a and the nozzle 34 provided in the boiling apparatus 21. It is preferred that the moisture content of the rice grains evacuated from the exit port 23 falls within a range of about 60 to 62%. The rice grains having completed the boiling process and ready for being evacuated from the exit port 23 have been converted completely to the alpha-type. Since there occurs no cracking on the surfaces of the rice grains, there is no flow-out of starch having been converted to the alpha-type. This is because that, during the secondary alpha-type conversion, cracking on the surfaces of the rice grains, which is due to contacts of the rice grains with each other and the like, will not occur due to the reason that the portions of the rice grains other than the core portions but including the surfaces have been already converted to the alpha-type and further dried preliminarily, which strengthens such portions mechanically and makes them resistant to the breaks thereof.

Since rice grains having completed the secondary alpha-type conversion process are formed in chains or blocks, they are fed into the separation-into-single-grains apparatus 85 to thereby separate the rice grains in chains into single grains (Separation-into-single-grains step (Step 8)). Specifically, rice grains supplied from the supply hopper 92 receive water ejected from the water-ejecting nozzle 99 and flow down on the screen 93 at the same time while being broken up by the breaking up roller 98. During this flowing down, rice grains receive air either of normal or high temperature at a high speed from the air-ejecting section 94. As a result, moisture attached to the rice grains is blown off with the said high speed air to thereby separate the rice grains gradually into single grains. During the period of time in which the rice grains are transferred due to vibration on the screen 86 toward the exit port 97, the rice grains receive blowing air of normal temperature generated by the air-blowing apparatus 89, which is coming from the lower portion of the screen 86. The rice grains also receive high speed air blowing of normal temperature ejected from the air-ejecting nozzle 87. As a result, the rice grains are completely converted to the alpha-type, and water attached to the rice grains is removed. It is preferred to appropriately change the speed of the aforesaid transfer due to vibration, blowing air flow and other conditions so that the moisture content of the rice grains to be evacuated from the exit port 97 may be adjusted to, for example, about 58%. Besides, despite that the rice grains receive air blowing at a high speed and the like in the separation-into-single-grains step, it is possible to prevent the surfaces of rice grains from cracking because at least the surfaces of rice grains have been strengthened during the primary alpha-type conversion step and the preliminary drying step.

Rice grains having been separated into single grains are supplied to the aforesaid drier 35, where they are consummatively dried (Final drying step (Step 9)). Specifically, rice grains are dried up to a moisture content of 9% with hot blowing air of 130° C. during the transfer for about 25 minutes is taken place. Now, the preparation of the instant rice containing polished rice is completed.

According to the process for preparation of the instant rice of the present invention, starch layers of rice grains excluding the core portions can be converted to the alpha-type without causing cracking on the surfaces thereof by employing a process, wherein rice grains are primarily immersed, then subjected to primary alpha-type conversion to thereby convert at least the surfaces of rice grains to the alpha-type, and with help of protection effect given by the residual bran layers. Then, rice grains are preliminarily dried and consummatively polished, and further subjected to the secondary immersing and the secondary alpha-type conversion. During these processes, there occurs no cracking on the surfaces of rice grains and the complete alpha-type conversion can be achieved, because rice grains except their core portions have been strengthened during the primary alpha-type conversion process and the preliminary drying process, which makes the rice grains resistant to the breaks thereof. Further, in the following separation-into-single-grains step, neither cracking on the surfaces of rice grains nor breaks in the shapes thereof will be generated due to the separation. Following thereto, rice grains are consummatively dried, and the preparation of the instant rice containing polished rice is completed. Since it is observed no breaks in the shapes of the finished instant rice, instant rice containing polished rice with good appearance and quality, into which nutrients contained in bran are permeated, can be provided in accordance with the present invention.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A process for preparing instant rice comprising:
   a milling step for milling brown rice to remove a controlled proportion of bran layer;
   a primary immersing step for causing rice grains obtained in the said milling step to absorb water;

a primary alpha-type conversion step for converting surface layers of the rice grains obtained in the said immersing step to the alpha-structure type, wherein the converting of the surface layers comprises about 60% to 90% of the rice grains being converted to the alpha-structure type;

a preliminary drying step for drying the rice grains obtained in the said primary alpha-type conversion step up to a moisture content higher than a moisture content after final drying;

a final polishing step for consummatively polishing the rice grains obtained in the said preliminary drying step;

a secondary immersing step for causing the rice grains obtained in the said final polishing step to absorb water once again;

a secondary alpha-type conversion step for completely converting the rice grains obtained in the said secondary immersing step to the alpha-type;

a separation-into-single-grains step for separating the rice grains obtained in the said secondary alpha-type conversion step into single grains; and a final drying step for consummatively drying the rice grains obtained in the said separation-into-single-grains step.

2. A process for preparing instant rice according to claim 1, further comprising a water-removing step between said primary immersing step and said primary alpha-type conversion step.

3. A process for preparing instant rice according to claim 1, further comprising a water-removing step between said secondary immersing step and said secondary alpha-type conversion step.

4. A process for preparing instant rice according to claim 1, further comprising a first water-removing step between said primary immersing step and said primary alpha-type conversion step and a second water-removing step between said secondary immersing step and said secondary alpha-type conversion step.

5. Instant rice characterized by being prepared according to the process defined in claim 1.

6. A process for preparing instant rice according to claim 1, wherein the milling step comprises milling using a vertical-type polishing machine.

7. A process for preparing instant rice according to claim 1, wherein the primary immersing step comprises using an apparatus that is substantially different structurally from an apparatus utilized in the secondary immersing step.

8. A process for preparing instant rice according to claim 1, further comprising performing a water-removing step after the primary immersing step.

9. A process for preparing instant rice according to claim 1, further comprising performing a water-removing step after the secondary immersing step.

10. A process for preparing instant rice according to claim 1, further comprising:
performing a first water-removing step after the primary immersing step; and
performing a second water-removing step after the secondary immersing step.

11. A process for preparing instant rice according to claim 1, wherein the separation-into-single-grains step comprises ejecting air toward rice grains.

12. A process for preparing instant rice according to claim 1, wherein the separation-into-single-grains step comprises:
providing rice grains in a screen; and
ejecting air toward the screen and rice grains.

13. A process for preparing instant rice according to claim 1, wherein the separation-into-single-grains step comprises:
providing rice grains in a screen;
ejecting air toward the screen and rice grains; and
vibrating the screen to transport the rice grains to an exit port.

14. A process for preparing instant rice according to claim 1, wherein the separation-into-single-grains step comprises:
ejecting water toward rice grains;
providing the rice grains in a screen; and
ejecting air toward the screen.

15. A process for preparing instant rice accordingly to claim 1 wherein the secondary alpha-type conversion step comprises converting core portions of the rice grains to the alpha-structure type, and wherein the secondary immersing step comprises providing the moisture content of the rice grains to a range of about 55% to 60%.

16. A process for preparing instant rice accordingly to claim 1 wherein the milling step comprises milling 30% to 70% of the brown rice.

* * * * *

UNITED STATES PATENT AND TRADEMARK OFFICE
CERTIFICATE OF CORRECTION

PATENT NO. : 7,357,954 B2 Page 1 of 1
APPLICATION NO. : 10/699160
DATED : April 15, 2008
INVENTOR(S) : Shigeharu Kanemoto et al.

It is certified that error appears in the above-identified patent and that said Letters Patent is hereby corrected as shown below:

On Title page of patent, please insert under (73) Assignee:

--Riviana Foods Inc., Houston, TX--

Signed and Sealed this

Fourteenth Day of July, 2009

JOHN DOLL
*Acting Director of the United States Patent and Trademark Office*